US011818623B2

(12) United States Patent
Chen et al.

(10) Patent No.: US 11,818,623 B2
(45) Date of Patent: *Nov. 14, 2023

(54) SYSTEM AND METHOD FOR MONITORING DEVICES RELATIVE TO A USER DEFINED GEOGRAPHIC AREA

(71) Applicant: Aeris Communications, Inc., San Jose, CA (US)

(72) Inventors: Yixiang Chen, Palo Alto, CA (US); Fumito Kayama, Pacifica, CA (US); Santosh Astagi, San Mateo, CA (US); Drew S. Johnson, San Jose, CA (US)

(73) Assignee: Aeris Communications, Inc., San Jose, CA (US)

( * ) Notice: Subject to any disclaimer, the term of this patent is extended or adjusted under 35 U.S.C. 154(b) by 498 days.

This patent is subject to a terminal disclaimer.

(21) Appl. No.: 16/944,565

(22) Filed: Jul. 31, 2020

(65) Prior Publication Data

US 2020/0367013 A1    Nov. 19, 2020

Related U.S. Application Data

(63) Continuation of application No. 15/696,950, filed on Sep. 6, 2017, now Pat. No. 10,750,312, which is a
(Continued)

(51) Int. Cl.
*H04W 4/021* (2018.01)
*H04L 67/02* (2022.01)
*H04W 4/70* (2018.01)

(52) U.S. Cl.
CPC ............ *H04W 4/021* (2013.01); *H04L 67/02* (2013.01); *H04W 4/70* (2018.02)

(58) Field of Classification Search
CPC ..... H04W 4/021; H04W 4/022; H04W 4/023; H04W 4/025; H04W 4/029; H04W 4/70;
(Continued)

(56) References Cited

U.S. PATENT DOCUMENTS 6,239,707 B1   5/2001  Park
6,496,775 B2  12/2002  McDonald, Jr.
(Continued)

FOREIGN PATENT DOCUMENTS

CN     104835029    8/2015
WO    2014106299    7/2014
(Continued)

OTHER PUBLICATIONS

Perera et al., Energy Efficient Location and Activity-aware On-Demand Mobile Distributed Sensing Platform for Sensing as a Service in IoT Clouds, http://arxiv.org/abs/1601.00428, Apr. 1, 2016.
(Continued)

*Primary Examiner* — Babar Sarwar
(74) *Attorney, Agent, or Firm* — Shih IP Law Group, PLLC

(57) ABSTRACT

The present invention relates generally to providing a system and method for monitoring devices relative to a user defined geographic area using an enablement platform for building web sites and web applications using data storage, management and publication capabilities of hosted web services. The system and method for monitoring M2M devices relative to a user defined geographic area (geofence) are built on existing AerCloud concepts by allowing user to define location attributes and by using the user defined location attributes to configure and evaluate geofence parameters and issue alerts if the devices are performing outside the geofence parameters.

24 Claims, 12 Drawing Sheets

Related U.S. Application Data continuation of application No. 15/234,463, filed on Aug. 11, 2016, now Pat. No. 9,774,994.

(60) Provisional application No. 62/205,639, filed on Aug. 14, 2015.

(58) Field of Classification Search
CPC .......... H04W 4/90; H04L 67/02; H04L 67/04; H04L 67/1001; C03C 3/064; C03C 8/16; C03C 8/18; G06Q 10/08; G09B 29/007; G09B 29/10; H01B 1/16; H01B 1/22; H01J 1/02; H01J 9/02
See application file for complete search history.

(56) References Cited

U.S. PATENT DOCUMENTS

| | | |
|---|---|---|
| 6,651,001 B2 | 11/2003 | Apsell |
| 6,687,356 B1 * | 2/2004 | Glitho ................. H04L 65/1094 |
| | | 370/215 |
| 6,931,309 B2 | 8/2005 | Phelan |
| 7,213,048 B1 * | 5/2007 | Parupudi ................. G06F 16/29 |
| | | 709/224 |
| 7,246,009 B2 | 7/2007 | Hamblen |
| 7,801,538 B2 | 9/2010 | Weiser |
| 7,848,765 B2 | 12/2010 | Phillips |
| 8,000,726 B2 | 8/2011 | Altman |
| 8,018,329 B2 | 9/2011 | Morgan |
| 8,135,505 B2 * | 3/2012 | Vengroff ................. G06Q 30/02 |
| | | 705/7.34 |
| 8,346,230 B2 | 1/2013 | Goodman |
| 8,473,148 B2 | 6/2013 | Nielsen |
| 8,510,200 B2 | 8/2013 | Pearlman |
| 8,566,014 B1 | 10/2013 | Kozolchyk |
| 8,589,330 B2 | 11/2013 | Petersen |
| 8,593,277 B2 | 11/2013 | Nath |
| 8,595,696 B2 | 11/2013 | Maximilien et al. |
| 8,630,768 B2 | 1/2014 | McClellan |
| 8,667,456 B1 | 3/2014 | Czymontek |
| 8,725,569 B2 * | 5/2014 | Liang ................. G06Q 30/0261 |
| | | 705/14.66 |
| 8,755,824 B1 | 6/2014 | Wang |
| 8,756,010 B2 | 6/2014 | Gupta |
| 8,869,038 B2 | 10/2014 | Eick |
| 8,909,256 B2 | 12/2014 | Fraccaroli |
| 8,913,983 B2 | 12/2014 | Lorello |
| 8,949,022 B1 | 2/2015 | Fahrner |
| 8,971,930 B2 * | 3/2015 | Li ................. H04W 4/021 |
| | | 455/414.1 |
| 9,014,888 B2 | 4/2015 | Sukkarié |
| 9,043,222 B1 * | 5/2015 | Kerr ................. G06Q 30/0621 |
| | | 725/35 |
| 9,076,009 B2 | 7/2015 | Sathish |
| 9,076,165 B2 | 7/2015 | Busch |
| 9,104,738 B2 | 8/2015 | Kay et al. |
| 9,119,038 B2 | 8/2015 | Woods |
| 9,122,693 B2 | 9/2015 | Blom |
| 9,140,567 B2 | 9/2015 | Fryer |
| 9,141,266 B2 | 9/2015 | McCormick |
| 9,146,721 B1 | 9/2015 | Nagaraja |
| 9,210,534 B1 | 12/2015 | Matthieu |
| 9,225,519 B1 * | 12/2015 | Fraccaroli ............. H04W 12/64 |
| 9,250,887 B2 | 2/2016 | Lucovsky |
| 9,275,114 B2 | 3/2016 | Milton |
| 9,277,362 B2 | 3/2016 | Li |
| 9,349,128 B1 | 5/2016 | Kerr |
| 9,424,751 B2 | 8/2016 | Hodges |
| 9,507,346 B1 | 11/2016 | Levinson |
| 9,576,295 B2 | 2/2017 | Volpe |
| 9,615,202 B2 | 4/2017 | Dal Santo |
| 9,661,470 B1 | 5/2017 | Du Bois |
| 9,712,486 B2 | 7/2017 | Johnson |
| 9,712,972 B2 | 7/2017 | Lynch |
| 9,741,191 B1 | 8/2017 | Wong |
| 9,774,994 B2 * | 9/2017 | Chen ................. H04W 4/021 |
| 9,792,567 B2 | 10/2017 | Khasis |
| 9,805,521 B1 | 10/2017 | Davidson |
| 9,817,948 B2 | 11/2017 | Swank |
| 9,826,345 B2 | 11/2017 | Haro |
| 9,838,843 B1 | 12/2017 | Bajaj |
| 9,871,865 B2 | 1/2018 | Shaashua |
| 9,878,663 B1 | 1/2018 | Kochura |
| 9,988,058 B2 * | 6/2018 | Phillips ............. B60W 50/0098 |
| 10,015,353 B1 | 7/2018 | Perez |
| 10,037,668 B1 | 7/2018 | DesGarennes |
| 10,070,261 B2 | 9/2018 | Dal Santo |
| 10,097,960 B2 | 10/2018 | Tung |
| 10,231,084 B2 * | 3/2019 | Bagchi ................. H04W 4/40 |
| 10,735,904 B2 | 8/2020 | Dhillon |
| 2004/0111195 A1 * | 6/2004 | Vries ................. G01C 21/20 |
| | | 701/469 |
| 2004/0193617 A1 | 9/2004 | Adler |
| 2005/0090978 A1 * | 4/2005 | Bathory ................. G08G 7/00 |
| | | 701/3 |
| 2005/0096009 A1 * | 5/2005 | Ackley ................. H04M 1/663 |
| | | 455/414.1 |
| 2005/0156715 A1 * | 7/2005 | Zou ................. B60R 25/33 |
| | | 340/8.1 |
| 2006/0248121 A1 | 11/2006 | Cacenco |
| 2007/0143013 A1 | 6/2007 | Breen |
| 2007/0173991 A1 * | 7/2007 | Tenzer ................. G07C 5/008 |
| | | 701/31.4 |
| 2007/0173994 A1 | 7/2007 | Kubo |
| 2008/0033791 A1 | 2/2008 | Jones |
| 2008/0125965 A1 | 5/2008 | Carani |
| 2008/0319602 A1 * | 12/2008 | McClellan ............. G07C 5/085 |
| | | 701/31.4 |
| 2009/0009321 A1 * | 1/2009 | McClellan ............. G08G 1/207 |
| | | 340/539.13 |
| 2009/0079555 A1 | 3/2009 | Aguirre De Carcer et al. |
| 2009/0248883 A1 * | 10/2009 | Suryanarayana ....... G06F 9/451 |
| | | 709/229 |
| 2009/0019357 A1 | 11/2009 | Cudich |
| 2009/0275348 A1 * | 11/2009 | Weinreich ............. G01S 5/0036 |
| | | 455/456.3 |
| 2009/0309789 A1 * | 12/2009 | Verechtchiagine ..... G01S 19/42 |
| | | 342/357.33 |
| 2009/0326991 A1 * | 12/2009 | Wei ................. G06Q 10/08355 |
| | | 705/5 |
| 2010/0075648 A1 * | 3/2010 | Matsuoka ......... H04M 1/72457 |
| | | 455/418 |
| 2010/0088163 A1 | 4/2010 | Davidson |
| 2010/0094500 A1 * | 4/2010 | Jin ................. G01C 21/26 |
| | | 701/1 |
| 2010/0106603 A1 * | 4/2010 | Dey ................. G08G 1/096888 |
| | | 705/14.63 |
| 2010/0203901 A1 * | 8/2010 | Dinoff ................. H04W 4/022 |
| | | 455/456.3 |
| 2010/0214068 A1 * | 8/2010 | Nadkarni ............. G01S 15/876 |
| | | 340/10.1 |
| 2010/0277307 A1 | 11/2010 | Horton |
| 2010/0280734 A1 * | 11/2010 | Brinton ............. B60R 16/0236 |
| | | 701/101 |
| 2010/0289644 A1 | 11/2010 | Slavin |
| 2010/0306735 A1 | 12/2010 | Hoff et al. |
| 2011/0112768 A1 * | 5/2011 | Doyle ................. H04W 4/021 |
| | | 342/450 |
| 2011/0126168 A1 | 5/2011 | Ilyayev |
| 2011/0178811 A1 | 7/2011 | Sheridan |
| 2011/0202591 A1 | 8/2011 | Reis |
| 2011/0208797 A1 | 8/2011 | Kim |
| 2011/0238457 A1 | 9/2011 | Mason |
| 2012/0058764 A1 * | 3/2012 | Kang ................. H04W 60/02 |
| | | 455/435.1 |
| 2012/0260228 A1 | 10/2012 | Mallick |
| 2012/0330722 A1 | 12/2012 | Volpe et al. |
| 2013/0031029 A1 * | 1/2013 | Davidson ............. G07C 5/0825 |
| | | 705/417 |
| 2013/0055253 A1 | 2/2013 | Jubran |
| 2013/0066688 A1 | 3/2013 | Pinkus |

(56) References Cited

U.S. PATENT DOCUMENTS

| | | |
|---|---|---|
| 2013/0090106 A1* | 4/2013 | Mathews .............. H04W 4/06 455/418 |
| 2013/0093603 A1 | 4/2013 | Tschirhart |
| 2013/0103307 A1* | 4/2013 | Sartipi ............ G06Q 30/0261 701/465 |
| 2013/0190967 A1* | 7/2013 | Hassib ................ G06Q 10/00 701/31.5 |
| 2013/0212130 A1* | 8/2013 | Rahnama ............ H04W 4/021 707/792 |
| 2013/0245880 A1* | 9/2013 | McQuade ........... G07C 5/0808 701/32.4 |
| 2013/0254755 A1 | 9/2013 | Yousouf |
| 2013/0267253 A1 | 10/2013 | Amber |
| 2013/0289819 A1* | 10/2013 | Hassib ................ G07C 5/006 701/1 |
| 2013/0289873 A1 | 10/2013 | Mitchell |
| 2013/0297803 A1 | 11/2013 | Hate |
| 2013/0304347 A1* | 11/2013 | Davidson ............ G06Q 10/08 701/99 |
| 2013/0340305 A1* | 12/2013 | Mobley ............... A01K 11/008 40/300 |
| 2013/0346336 A1 | 12/2013 | Murphy |
| 2014/0026113 A1 | 1/2014 | Farooqi |
| 2014/0031073 A1 | 1/2014 | Davis |
| 2014/0057648 A1 | 2/2014 | Lyman |
| 2014/0059695 A1 | 2/2014 | Parecki |
| 2014/0062695 A1* | 3/2014 | Rosen ................ G08B 21/18 340/539.13 |
| 2014/0095214 A1 | 4/2014 | Mathe et al. |
| 2014/0141767 A1 | 5/2014 | Sharma |
| 2014/0155094 A1 | 6/2014 | Zises |
| 2014/0172294 A1* | 6/2014 | Kalra ................. G01C 21/3484 701/465 |
| 2014/0215043 A1 | 7/2014 | Ryu |
| 2014/0226470 A1 | 8/2014 | Kim |
| 2014/0274115 A1* | 9/2014 | Michalson ........... H04W 4/029 455/456.1 |
| 2014/0274136 A1* | 9/2014 | Edge .................. H04W 4/024 455/456.2 |
| 2014/0282380 A1 | 9/2014 | Abrahams |
| 2014/0325048 A1 | 10/2014 | Benchorin |
| 2014/0325394 A1 | 10/2014 | Hamill |
| 2014/0351411 A1 | 11/2014 | Woods |
| 2014/0357295 A1 | 12/2014 | Skomra |
| 2014/0359552 A1 | 12/2014 | Misra |
| 2014/0370911 A1* | 12/2014 | Gorgenyi ............ H04W 4/021 455/574 |
| 2014/0380264 A1 | 12/2014 | Misra et al. |
| 2015/0012908 A1* | 1/2015 | Farooqi ............... G06F 8/34 717/107 |
| 2015/0095355 A1 | 4/2015 | Patton |
| 2015/0106206 A1 | 4/2015 | Vengroff |
| 2015/0135163 A1 | 5/2015 | Mun |
| 2015/0149980 A1 | 5/2015 | Zhong |
| 2015/0163626 A1* | 6/2015 | Zimmer ............... H04W 4/029 455/404.2 |
| 2015/0163630 A1* | 6/2015 | Hughes, Jr. .......... H04W 4/21 455/456.3 |
| 2015/0173037 A1 | 6/2015 | Pijl |
| 2015/0180746 A1* | 6/2015 | Day, II ............... H04L 67/55 455/405 |
| 2015/0181016 A1 | 6/2015 | Jain |
| 2015/0245189 A1 | 8/2015 | Nalluri |
| 2015/0264527 A1 | 9/2015 | Wang |
| 2015/0271033 A1 | 9/2015 | Srivastava et al. |
| 2015/0278759 A1 | 10/2015 | Harris |
| 2015/0304175 A1 | 10/2015 | Maes |
| 2015/0350843 A1 | 12/2015 | Jensen et al. |
| 2016/0003627 A1* | 1/2016 | Bonhomme ......... G01C 21/26 701/400 |
| 2016/0041833 A1 | 2/2016 | Standley et al. |
| 2016/0042303 A1* | 2/2016 | Medina ............. G06Q 10/063114 705/5 |
| 2016/0050536 A1 | 2/2016 | You |
| 2016/0057209 A1 | 2/2016 | Parikh |
| 2016/0066141 A1* | 3/2016 | Jain .................... H04W 4/021 455/456.1 |
| 2016/0071333 A1* | 3/2016 | Haidar ................ G07C 5/006 701/29.3 |
| 2016/0073229 A1 | 3/2016 | Haro |
| 2016/0083697 A1 | 3/2016 | Phillips |
| 2016/0086397 A1* | 3/2016 | Phillips ............... G07C 5/008 701/1 |
| 2016/0103657 A1 | 4/2016 | Zhang et al. |
| 2016/0104096 A1 | 4/2016 | Ovick |
| 2016/0116596 A1* | 4/2016 | Rajala ................ G08B 21/0269 342/357.54 |
| 2016/0124742 A1 | 5/2016 | Rangasamy |
| 2016/0150021 A1 | 5/2016 | Britt |
| 2016/0173404 A1 | 6/2016 | Pouyllau |
| 2016/0203651 A1* | 7/2016 | Heath ................. G07C 5/08 705/13 |
| 2016/0247330 A1* | 8/2016 | Rork .................. H04W 4/021 |
| 2016/0284184 A1 | 9/2016 | Bean et al. |
| 2016/0286355 A1* | 9/2016 | Shur .................. H04W 4/025 |
| 2016/0357522 A1 | 12/2016 | Wee |
| 2016/0371553 A1 | 12/2016 | Farnham, IV |
| 2017/0006135 A1 | 1/2017 | Siebel |
| 2017/0006419 A1* | 1/2017 | Rajala ................ H04W 4/021 |
| 2017/0006430 A1 | 1/2017 | Chao |
| 2017/0024937 A1 | 1/2017 | Ramesh |
| 2017/0048669 A1* | 2/2017 | Chen .................. H04L 67/02 |
| 2017/0076511 A1 | 3/2017 | Busch-Sorensen et al. |
| 2017/0111765 A1 | 4/2017 | Benegal |
| 2017/0171204 A1 | 6/2017 | Forood |
| 2017/0203633 A1 | 7/2017 | High |
| 2017/0244841 A1* | 8/2017 | Costandi ............ H04L 65/1069 |
| 2017/0270792 A1 | 9/2017 | Breton |
| 2017/0323259 A1 | 11/2017 | Gillen |
| 2017/0349058 A1 | 12/2017 | Bernier |
| 2017/0359237 A1 | 12/2017 | Hao |
| 2017/0366933 A1* | 12/2017 | Chen .................. H04W 4/70 |
| 2018/0005522 A1 | 1/2018 | Pogula |
| 2018/0049001 A1 | 2/2018 | Volozh |
| 2018/0063666 A1 | 3/2018 | Broodney |
| 2018/0120826 A1 | 5/2018 | Rhim |
| 2018/0199239 A1 | 7/2018 | Sabater Maroto |
| 2018/0255428 A1* | 9/2018 | Bagchi ............... H04L 67/535 |
| 2018/0302476 A1 | 10/2018 | Perez |
| 2018/0365785 A1 | 12/2018 | Boss |
| 2018/0372503 A1* | 12/2018 | Bagchi ............... G06N 20/00 |
| 2019/0266518 A1* | 8/2019 | Medina ............... H04W 4/024 |
| 2019/0285426 A1 | 9/2019 | Mitchell |

FOREIGN PATENT DOCUMENTS

| | | |
|---|---|---|
| WO | 2015143416 | 9/2015 |
| WO | 2016025495 | 2/2016 |

OTHER PUBLICATIONS

Merlino et al., Mobile crowdsensing as a service: A platform for applications on top of sensing Clouds, http://www.sciencedirect.com/science/article/pii/S0167739X15002976, Mar. 2016.

International Search Report and Written Opinion from International Application No. PCT/US16/46923 dated Oct. 27, 2016.

Brouwers et al., Dwelling in the canyons: Dwelling detection in Urban Environments Using GPS, Wi-Fi, and Geolocation, Dec. 14, 2011.

Boukhechba et al.,Hybrid battery-friendly mobile solution for extracting users' visited places, Dec. 31, 2016.

Wikipedia, "Virtual Machine,"2014, pp. 1-9, downloaded from the Wayback Machine Internet Archive at , <url>:https://web.archive.org/web/20140402003043/https://en.wikipedia.org/wiki/Virtual_machine.

Wikipedia, "Virtual Machine, "2013, pp. 1-11, downloaded from the Wayback Machine Internet Archive at <url>:https://web.archive.org/web/20130402165412/https://en.wikipedia.org/wiki/Wireless_sensor_network.

(56) References Cited

OTHER PUBLICATIONS

Wei-Tek Tsai et al., "Service-Oriented Cloud Computing Architecture,"2010 [retrieved on May 9, 2019], Seventh International Conference on Information Technology: New Generations, pp. 684-689, downloaded from: https://ieeexplore.ieee.org/. 2010.

B Loganayagi et al., "Creating Virtual Platform for Cloud Computing, "2010 [retrieved on May 9, 2019], 2010 IEEE International Conference on Computational Intelligence and Computing Research, pp. 1-4, downloaded from: https://ieeexplore.ieee.org 2010.

Radha Guha et al, "Impact of Web 2.0 and Cloud Computing Platform on Software Engineering,"2011 [retrieved on Jun. 9, 2019], International Symposium on Electronic System Design, pp. 213-218, downloaded from:https//ieeexplore.ieee.org 2011.

International Search Report and Written Opinion from International Application No. PCT/US16/46924 dated Oct. 28, 2016.

"GeoFencing & Alerts", myGeoTracking, Abaqus Inc., Jul. 11, 2016, 1 page, Retrieved from: http://www.mygeotracking.com/solutions/pdf/geo_fencing_alerts.pdf.

Almomani et al., "Ubiquitous GPS vehicle tracking and management system", In Applied Electrical Engineering and Computing Technologies (AEECT), Dec. 31, 2011, IEEE Jordan Conference on, pp. 1-6.

Dennis Mbuvi, "Airtel Provide Connectivity to 2nk Sacco's Frotcom Fleet Management System", Airtel, Africa News Service, Feb. 2013.

Gerla et al., "Internet of vehicles: From intelligent grid to autonomous cars and vehicular clouds", In Internet of Things (WF-IoT), 2014 IEEE World Forum on, pp. 241-246., Dec. 31, 2014.

Rusu et al., "Localization in large-scale underground environments with RFID", 24th Canadian Conference on Electrical and Computer Engineering (CCECE), May 31, 2011.

Jin et al., "An information framework for creating a smart city through internet of things", IEEE Internet of Things Journal, 1(2), pp. 112-121, Dec. 31, 2014.

Gantait et al., Use vehicle sensor data to execute smart transactions in Blockchain, IBM, Jun. 5, 2017., Retrieved from Internet: https://www.ibm.com/developerworks/cloud/library/cl-blockchain-for-cognitive-iot-apps2/.

Adelabu, Design and Construction of a Vehicle Tracking and Accident Alert System Using GPS and GSM Module, Nov. 30, 2017., Retrieved from the Internet: http://repository.fuoye.edu.ng/bitstream/123456789/1441/1/DESIGN%20AND%20CONSTRUCTION%20%20OF%20A%20VEHICLE%20TRACKING%20AND%20ACCIDENT%20ALERT%20SYSTEM%20%20USING%20%20GPS%20%20AND%20GSM%20MODULE.pdf. (C) Nov. 2017.

AT&T, Fleet management and tracking, Feb. 26, 2018., Retrieved from the Internet: https://www.business.att.com/solutions/Service/internet-of-things/vehicle-solutions/iot-connected-fleet/. (C)2018. Earliest publication date via Wayback archive:http://web.archive.org/web/20180226093503/https://www.business.att.com/solutions/Service/internet-of-things/vehicle-solutions/iot-connected-fleet/.

Frey, IoT ushers in a new era for supply chain fulfillment, Oct. 25, 2017, Retrieved from the Internet: https://internetofthingsagenda.techtarget.com/blog/IoT-Agenda/IoT-ushers-in-a-new-era-for-supply-chain-fulfillment.

International Search Report and Written Opinion from International Application No. PCTUS1838825 dated Sep. 18, 2018.

* cited by examiner

Figure 7

An example of data structure that is sent to AerCloud.

```
"rule": {
"assumptions": [{"parameter": "speedKmHr", "op": ">", "value": "100"}],
"actionType": "NOTIFY",
"geofence": {
"eventType": "INSIDE",
"areas": {
"type": "FeatureCollection",
"features": [
{
"type": "Feature",
"properties": {
"areaId": "areaId_0"
},
"geometry": {
"type": "Polygon",
"coordinates": [
[-122.39456176757811, 37.975597528091235],
},
{
"type": "Feature",
"properties": {
"areaId": "areaId_1",
"radius": "13665.473381915877"
},
"geometry": {
"type": "Point",
"coordinates": [-122.01004028320312, 37.94203148678865]
```

Geofence Workflow

Figure 9
Geofence Configuration

Example:
```
{
  "geofence": {
    "eventType": "INSIDE",
    "areas": {
      "type": "FeatureCollection",
      "features": [
        {
          "type": "Feature",
          "properties": {
            "radius": "1000",
            "areaId": "1"
          },
          "geometry": {
            "type": "Point",
            "coordinates": [
              -121.966842,
              37.387096
            ]
          }
        }
      ]
    }
  }
}
```

- A geofence can contain multiple geographical areas but each area must be a valid GeoJSON object.

| Parameter Name | Description |
|---|---|
| EventType | INSIDE or OUTSIDE |
| Areas | A GeoJSON Feature Collection object. |

- Required GeoJSON Properties
  - "areaId" – Is used for notifying INSIDE event type.
  - "radius" - Required if the object type is Point. Its value is the radius of a circle in meters.

Figure 10

Evaluating a Geofence

| Event Type | Trigger Criteria | Trigger |
|---|---|---|
| INSIDE | The geofence rule is "true" if a device location is within any area defined in the fence. "False" otherwise | Device data is sent to an application only if the geofence rule is evaluated to true. The data is decorated with the "area id" that triggered the fence |
| OUTSIDE | The geofence rule is "true" if a device location is outside all area defined in the fence. "False" otherwise | Device data is sent to the application only if the geofence rule is evaluated to true. |

Figure 11

User Defined Location Attributes

| Predicate Name | Description |
|---|---|
| normalizedProperty | • "LOC_LAT" - Indicates that this data model parameter designates latitude. Default is "latitude".<br>• "LOC_LON" - Indicates that this data model parameter designates longitude. Default is "longitude".<br>• "LOC_ALT" - Indicates that this data model parameter designates altitude. Default is "altitude". |

- Normalizing the data model definition using the "metadata" field.

SYSTEM AND METHOD FOR MONITORING DEVICES RELATIVE TO A USER DEFINED GEOGRAPHIC AREA

CROSS-REFERENCE TO RELATED APPLICATION

This application is a Continuation of U.S. application Ser. No. 15/696,950, filed Sep. 6, 2017; which is a Continuation of U.S. application Ser. No. 15/234,463, filed Aug. 11, 2016, now U.S. Pat. No. 9,774,994, issued Sep. 26, 2017; which claims priority to U.S. Provisional Application No. 62/205,639, filed Aug. 14, 2015, which is incorporated herein by reference in its entirety; and is related to U.S. patent application Ser. No. 15/234,493, filed on Aug. 11, 2016, entitled "AERCLOUD APPLICATION EXPRESS AND AER-CLOUD APPLICATION EXPRESS LAUNCHER" which is incorporated herein by reference in its entirety.

FIELD OF THE INVENTION

The present invention relates generally to providing a system and method for monitoring devices relative to a user defined geographic area using an enablement platform for building web sites and web applications using data storage, management and publication capabilities of hosted web services.

BACKGROUND

With the explosion of the Internet of Things (IoT) and the number of devices connected over internet and wireless communications and generating data for use in user-defined applications, it has become more and more important to enable users to easily build web-based applications that allow use of this generated data for meaningful purposes, such as real time monitoring of and interaction with Machine to Machine (M2M) services devices and services within a communication infrastructure.

An application for monitoring M2M devices may want to know if a device location is within or outside a geographical boundary and/or access other data regarding that device. For example, an application may want to know if a delivery truck has left its depot or has arrived at its designated next stop at certain time or speed of that truck at a particular time.

Accordingly, what is needed is a system and method to address the issue of real time monitoring of M2M devices. The present invention addresses such a need.

SUMMARY

The present invention relates generally to providing a system and method for monitoring devices relative to a user defined geographic area using an enablement platform for building web sites and web applications using data storage, management and publication capabilities of hosted web services. The system and method for monitoring devices relative to a user defined geographic area (geofence) are built on existing AerCloud concepts by allowing user to define location attributes and by using the user defined location attributes to configure and evaluate geofence parameters and issue alerts if the devices are performing outside the geofence parameters.

BRIEF DESCRIPTION OF THE DRAWINGS

FIG. 7 illustrates an example of data structure that is sent to AerCloud according to an embodiment of the present invention.

FIG. 9 illustrates an example of Geofence configuration according to an embodiment of the present invention.

FIG. 10 illustrates an example of criteria for evaluating a Geofence according to an embodiment of the present invention.

FIG. 11 illustrates an example of user defined location attributes according to an embodiment of the present invention.

DETAILED DESCRIPTION

Figure 1:
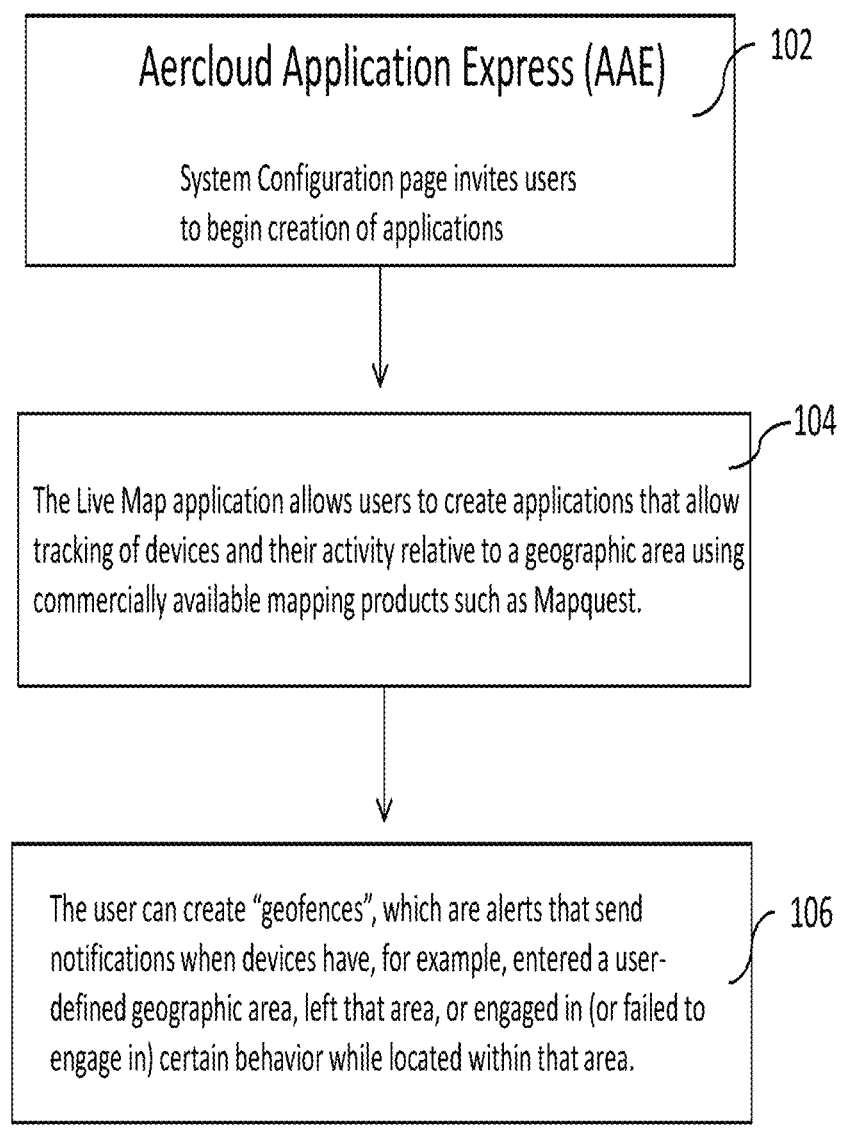
FIG. 1 is a diagram illustrating various steps involved in creating a new instance for development of web sites and web applications and creation of applications using an enablement platform according to an embodiment of the present invention.

The present invention relates generally to providing a system and method monitoring devices relative to a user defined geographic area using an enablement platform for building web sites and web applications using data storage, management and publication capabilities of hosted web services.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Machine to machine (M2M) network communications involves technologies to communicate with other devices often of similar abilities, different from traditional cellular communication networks for instance. In basic M2M environments, a device having limited logic (such as a sensor, meter, etc.) and limited resources (such as computing power) is resident at a location to typically captured measurable event data (such as temperature, pressure, quantity, etc.). The device is connected through a communications network to a remote computer or server having an application layer of specific software. The data received from the device is converted to relevant information associated with the measured event data through the application and may often thereafter undergo analysis or further similar assessment. In many cases a device, when activated, may trigger and communicate the events it is intended for so that those communicated events will then be acted upon by other machines, applications, and/or users on the network.

M2M environments often involve systems of networks, wired and wireless, that are to be connected to the internet and include personal appliances and similar devices. In M2M networks, typically devices may stationary or mobile and be connected via wired or wireless access protocols, often through WiFi network protocols or a 3GPP Mobile network protocol. These devices may also have seasonal and/or elastic connectivity needs (e.g., agricultural business needs, store and forward capability). Often in busy M2M networks, there is an 'always on' device being used such as a general packet radio services (GPRS) or internet gateway. However, M2M communication infrastructure remains most suited to the communication needs and patterns of devices having similar abilities, characteristically, for communicating with other systems and devices on the same network.

An application for monitoring M2M devices may want to know if a device location is within or outside a geographical boundary and/or access other data regarding that device. For example, an application may want to know if a delivery truck has left its depot or has arrived at its designated next stop at certain time or speed of that truck at a particular time. This can be difficult due to limited logic as well as limited resources available to an M2M device.

Although a system and method in accordance with the present invention is described with respect to an application for monitoring devices relative to an user defined geographic area using an enablement platform for building web sites and web applications using data storage, management and publication capabilities of hosted web services, in M2M domain, as used herein the term "application" is intended to be inclusive, interchangeable, and/or synonymous with other similar applications as described further below, though one will recognize that functionally different types of applications may have characteristics, functions and/or operations which may be specific to their individual capabilities and/or deployment.

The present invention provides a system and method for monitoring devices relative to an user defined geographic area using an enablement platform which enables setting up new instances by collecting the required information from the user and feeding it to the necessary pages of the Hosted Data Service (HDS) in the background and developing production-ready M2M applications, using data storage, management and publication capabilities of hosted web services by providing easy-to-use software tools or widgets provided on an "out of the box" basis and an Application Programming Interface (API) that interacts with the instance at the HDS.

The enablement platform hereinafter is referred to as AerCloud Application Express (AAE) Launcher and AAE, where AAE Launcher is used with a data management and publication service. Aercloud Application Express (AAE) is an application which is used to create new applications for use of data from M2M devices. This is an application running at a website that uses a simple interface (the Aercloud Application Express User Interface, or AAE UI) to help users who already have an instance at a HDS that can receive device data to develop production-ready M2M applications using easy-to-use software tools (widgets) provided on an "out of the box" basis and an Application Programming Interface (API) that interacts with the instance at the HDS. Once the user has used AAE Launcher to create a new instance for an application using Aeris AerCloud data management and publication service, the user is able to quickly develop production-ready M2M applications using AerCloud API and widgets provided on an "out of the box" basis at the AAE UI using AAE.

One such widget "Geofence" provides a system and method for creating user defined geographic area using an enablement platform for building web sites and web applications using data storage and management capabilities of web services. Geofence is built on existing AerCloud concepts by allowing user to define location attributes and by using the user defined location attributes to configure and evaluate geofence as described below.

System Configuration page invites users to begin creation of applications via Aercloud Application Express, first by entering their user credentials for their AerCloud account and, if applicable, a key for incorporating maps provided by commercially available mapping products into applications that use a map. Next, "The Live Map" application widget allows users to create applications that allow tracking of devices and their activity relative to a geographic area using commercially available mapping products.

This is achieved by creating "geofences", which are alerts that send notifications when devices have, for example, entered a user-defined geographic area, left that area, or engaged in (or failed to engage in) certain behavior while located within that area. The invention simplifies the method provided by mapping products for defining the boundaries of the geofence using the drawing tool and provides superior flexibility for setting alerts based on device behavior (such as which devices inside the geofence are behaving outside permitted parameters).

Creation and use of this application includes creating a new alert, seeing all the existing alerts, seeing the detail of the alert in a draggable overlay widget. In the draggable overlay widget, the user is permitted to: enter criteria for a new alert, update the selected alert, delete the selected alert and/or enter name of the alert.

While doing so, the user is permitted to select a shape for geo-fence, click the Add button in the select a geo-fence shape view to enable geo-fence drawing mode using the simplified tool. Other operations for issuing an alert based on user defined geographic area "geofence" included in the widget are, for example: 1. See an instruction of what to do while in the geofence mode in a green popup. i.e. "Click and drag the mouse on the map to draw a circle." 2. Remove the geo-fence you have just drawn 3. Set whether the alert should be executed when the device is inside of the geo-fence or outside of the geo-fence, 4. Set a condition with parameters retrieved from AerCloud 5. Inline create an existing condition 6. Inline delete an existing condition.

To describe the features of the present invention in more detail within the context of monitoring devices relative to a user defined geographic area "geofence" and for issuing alerts, refer to the accompanying figures in conjunction with the following discussions. These examples are used for purpose of illustration only, and should not be construed as limitations.

FIG. 1 is a diagram illustrating various steps involved in creation of application using an enablement platform according to an embodiment of the present invention. First, a user signs in Aercloud Application Express (AAE) using a valid user name and password. System Configuration page then invites the user via step 102 to begin creation of applications. The Live Map application allows users to create applications via step 104 that allow tracking of devices and their activity relative to a geographic area using commercially available mapping products. The user can then create "geofences" via step 106, which are alerts that send notifications when devices have, for example, entered a user-defined geographic area, left that area, or engaged in (or failed to engage in) certain behavior while located within that area.

Figure 2:
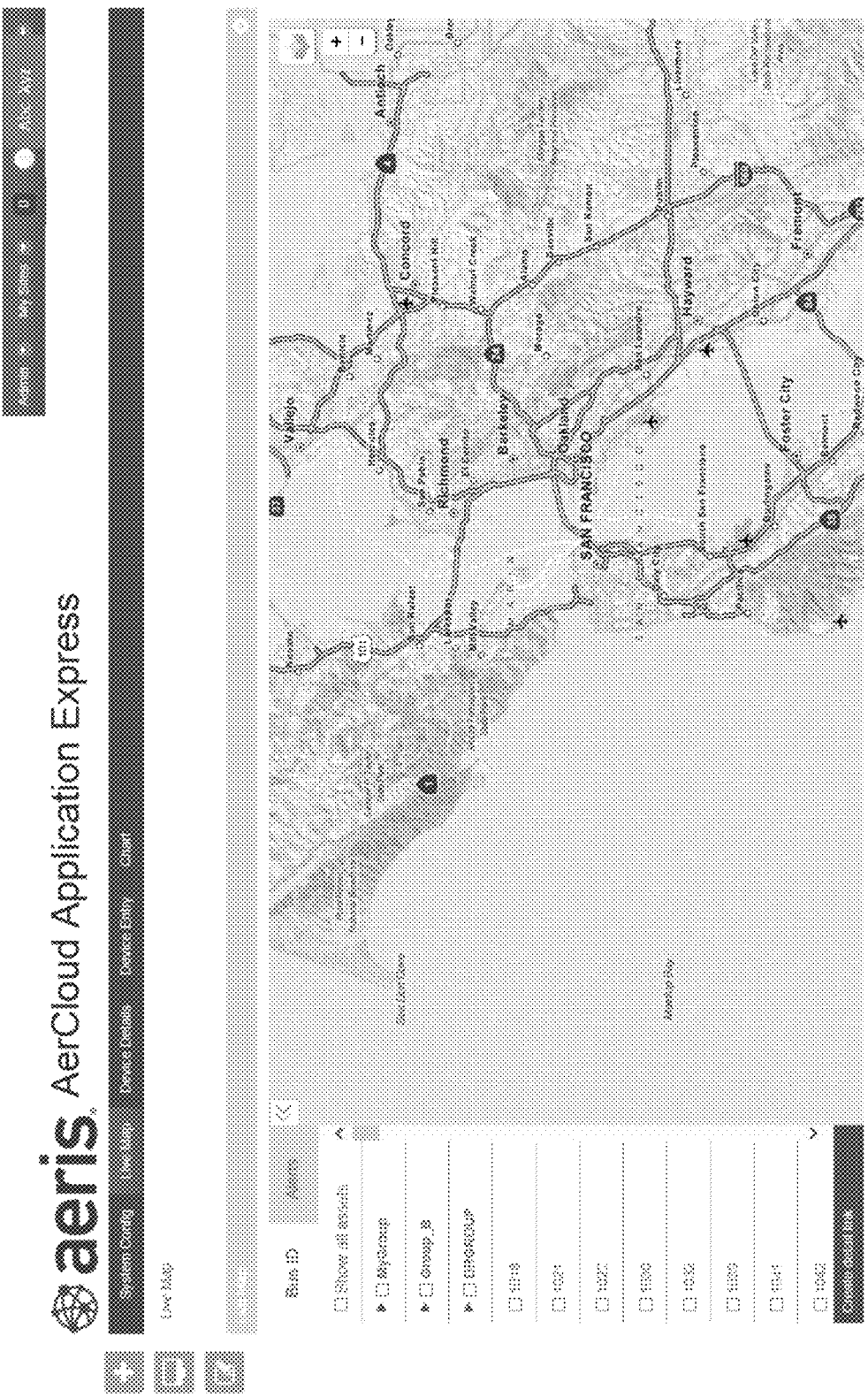
FIG. 2 is a diagram illustrating "Live Map", a widget provided by Application Express allowing users to create applications for tracking of devices and their activity relative to a geographic area using commercially available mapping products according to an embodiment of the present invention.

FIG. 2 is a diagram illustrating "Live Map", a widget provided by Application Express allowing users to create applications for tracking of devices and their activity relative to a geographic area using commercially available mapping products according to an embodiment of the present invention.

Figure 3:
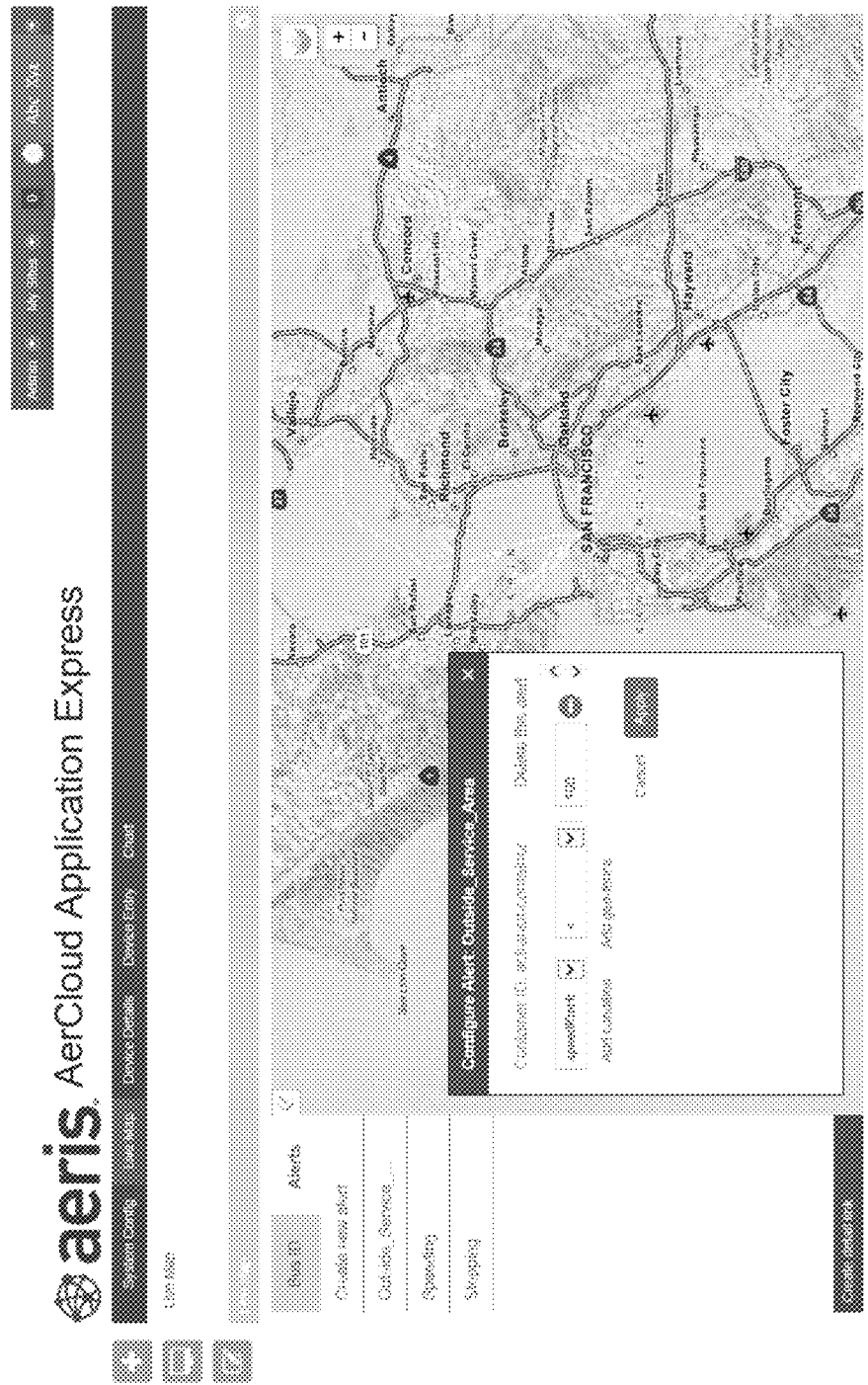
FIG. 3 is a diagram illustrating "Live Map", a widget provided by Application Express allowing users to configure alerts according to an embodiment of the present invention.

FIG. 3 is a diagram illustrating "Live Map", a widget provided by Application Express allowing users to configure alerts according to an embodiment of the present invention.

Figure 4:
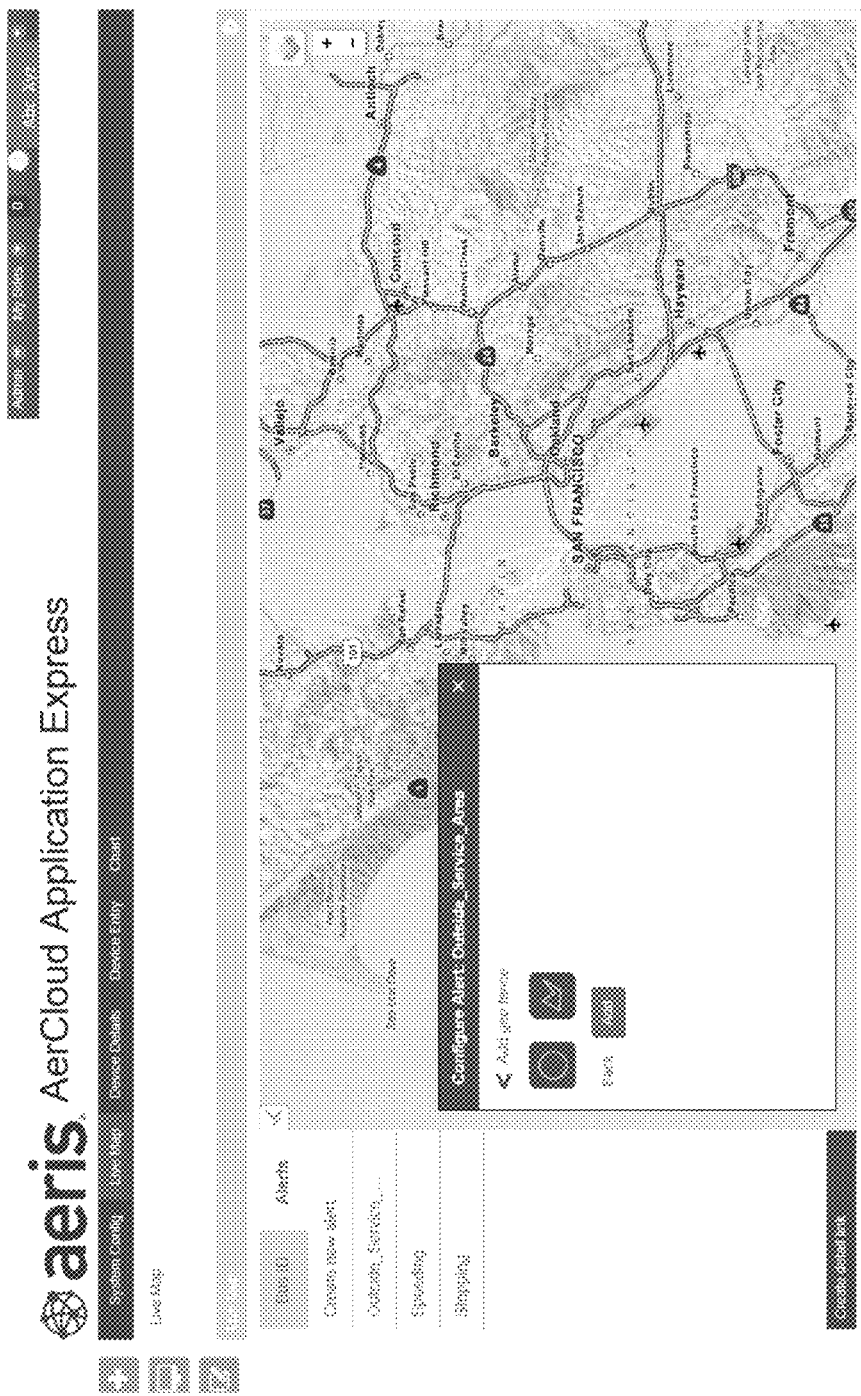
FIG. 4 is a diagram illustrating "Live Map", a widget provided by Application Express allowing users to configure alerts by adding "geofence" according to an embodiment of the present invention.

FIG. 4 is a diagram illustrating "Live Map", a widget provided by Application Express allowing users to configure alerts by adding "geofence" according to an embodiment of the present invention.

Figure 5:
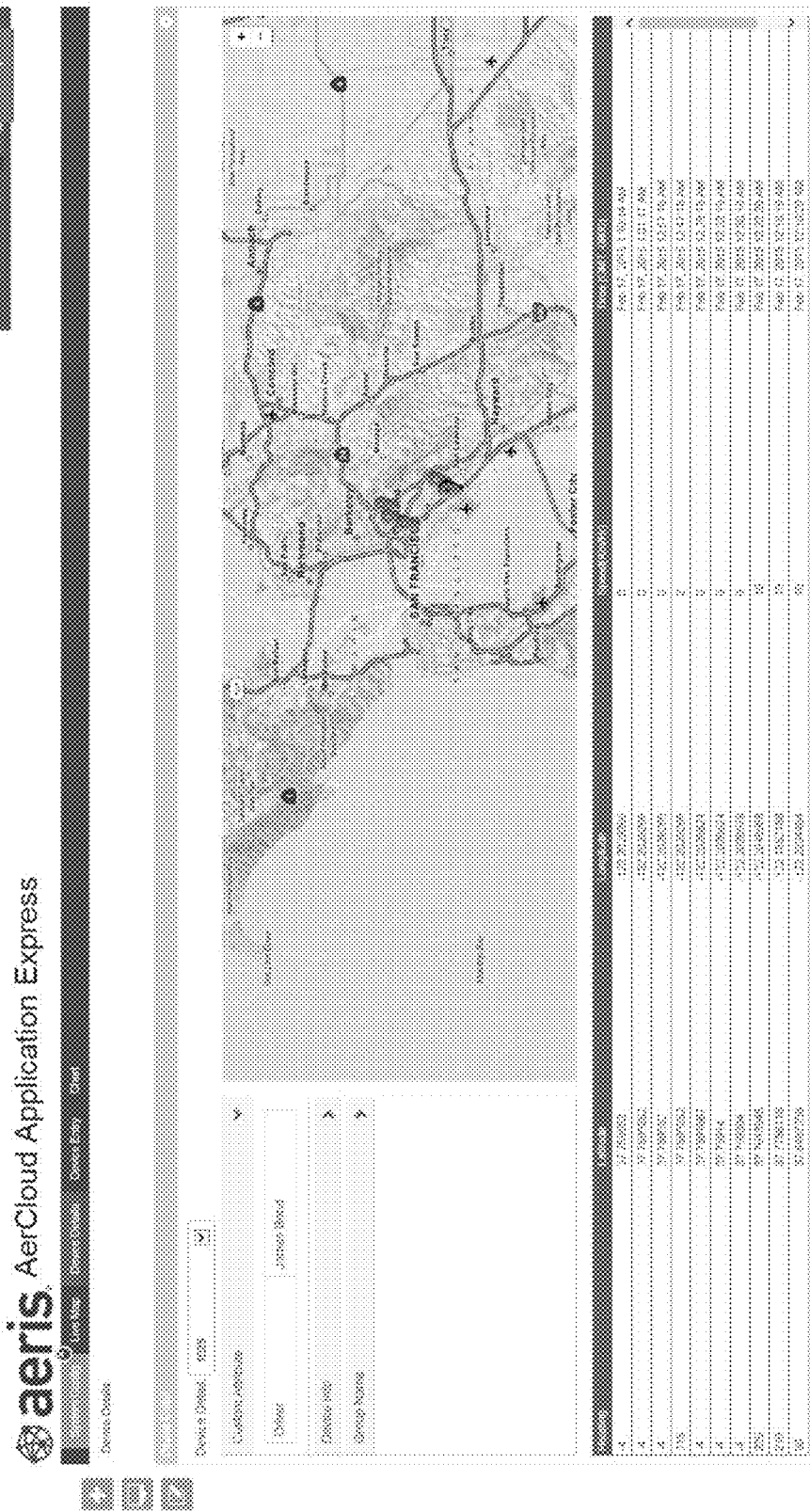
FIG. 5 is a diagram illustrating "Device Entry" a widget provided by Application Express and its interaction with "Device Details" widget illustrating types of location data returned by the Live Map and "Chart" application widgets according to an embodiment of the present invention.

FIG. 5 is a diagram illustrating "Device Entry" a widget provided by Application Express and its interaction with "Device Details" widget illustrating types of location data returned by the Live Map and "Chart" application widgets according to an embodiment of the present invention.

Figure 6:
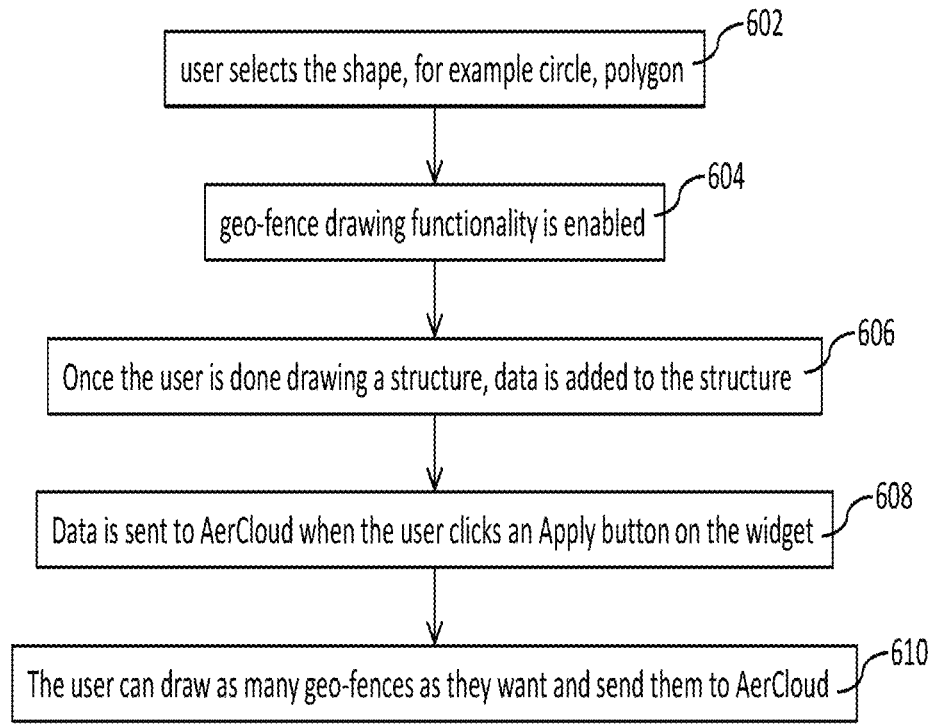
FIG. 6 is a flow diagram illustrating different steps involved in creating a user defined "geofence" according to an embodiment of the present invention.

FIG. 6 is a flow diagram illustrating different steps 602-612 involved in creating a user defined "geofence" according to an embodiment of the present invention, as described above. For example, the user is permitted to select a shape for geo-fence, by clicking the Add button in the select a geo-fence shape view to enable geo-fence drawing mode using the simplified tool. Other operations for issuing an alert based on user defined geographic area "geofence" included in the widget are, for example: 1. See an instruction of what to do while in the geo-fence mode in a green popup. i.e. "Click and drag the mouse on the map to draw a circle." 2. Remove the geo-fence you have just drawn 3. Set whether the alert should be executed when the device is inside of the geo-fence or outside of the geo-fence, 4. Set a condition with parameters retrieved from AerCloud 5. Inline create an existing condition 6. Inline delete an existing condition. When a user selects a shape, for example circle, polygon via step 602, geo-fence drawing functionality is enabled via step 604. Once the user is done drawing a structure, data is added to the structure via step 606. The data is sent to AerCloud when the user clicks an Apply button on the widget via step 608. The user can draw as many geo-fences as they want and send them to AerCloud via step 610. The geo-fence data is sent to Aercloud via step 612 with following properties also defined in the widget: 1. Setting assumptions, such as "speed, >, 100 km/hr"; 2. One of the following eventType: a. "INSIDE"—The geo-fence rule matches when a device location is within the any area in the geo-fence; b. "OUTSIDE"—The geo-fence rule matches when a device location is outside all areas in the geo-fence; 3. Setting radius for size of the circle shape; and 4. Setting areaId that will be used in notification for INSIDE type of geo-fence.

FIG. 7 illustrates an example of data structure that is sent to AerCloud according to an embodiment of the present invention.

Figure 8:
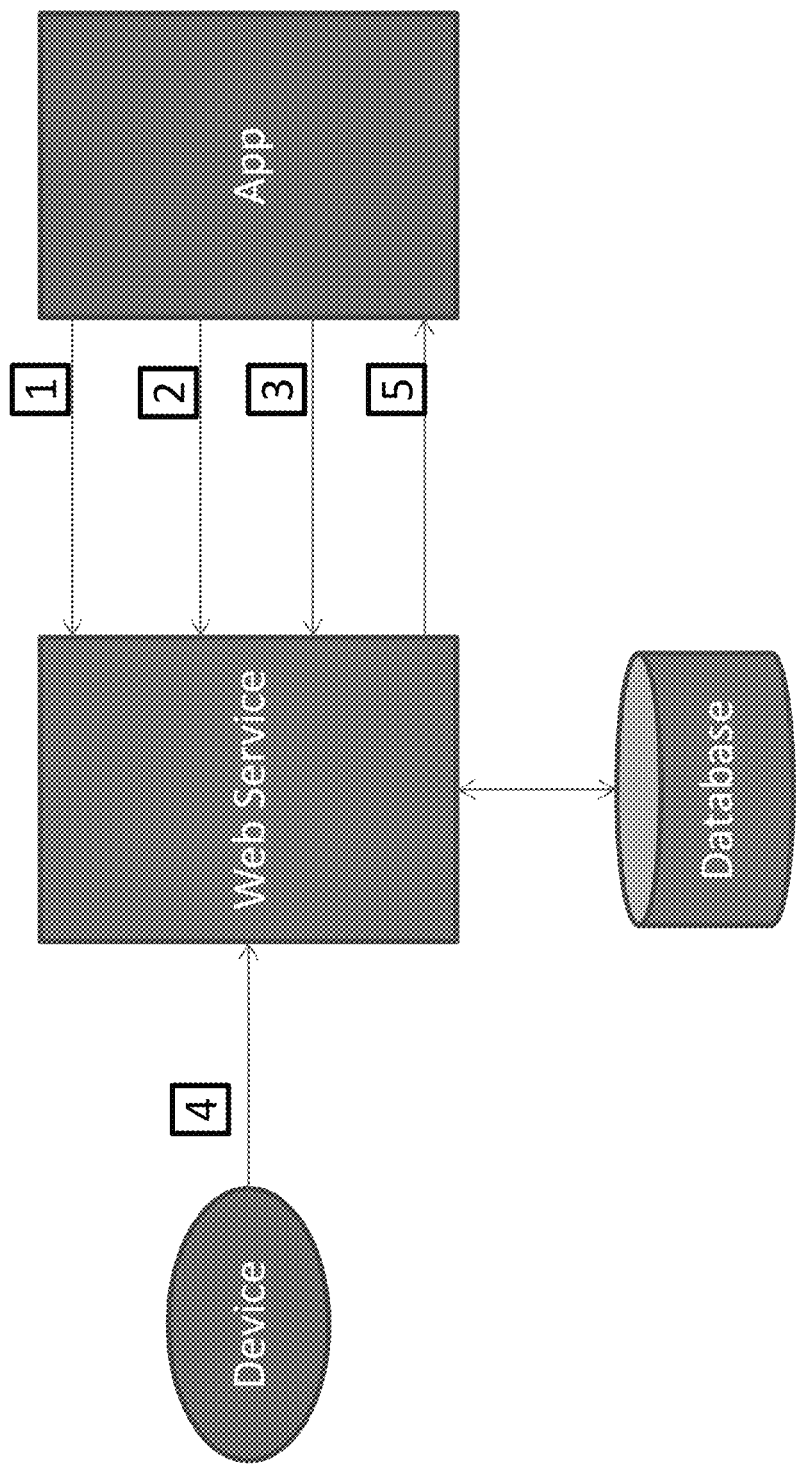
FIG. 8 illustrates an example of Geofence workflow according to an embodiment of the present invention.

FIG. 8 illustrates an example of Geofence workflow according to an embodiment of the present invention. Geofence is built on existing AerCloud concepts by allowing user to define location attributes and by using the user defined location attributes to configure and evaluate geofence parameters as described below. The application works by posting a data model with user-defined location attributes, which is saved in a database with a model id. It then posts a data container associated to the data model, which is saved in a database with a container id. A subscription is posted to the container with a geofence, which is saved in a database with a subscription id and its corresponding container id and device location data is posted to the container id. The web service component first reads the geofence associated with the subscription and the user-defined location attributes from the data model associated with the container. Then the web service extracts location from the device data using user-defined location attribute names. According to one embodiment, the location information is then used to evaluate the geofence rule.

FIG. 9 illustrates an example of Geofence configuration according to an embodiment of the present invention. A shown in FIG. 9, a geofence can contain multiple geographical areas but each area must be a valid GeoJSON object with some required properties such as "areaId" which is used for notifying INSIDE event type and "radius" which is required if the object type is Point. Its value is the radius of a circle in meters.

FIG. 10 illustrates an example of criteria for evaluating a Geofence according to an embodiment of the present invention. For Geofence "event type" "inside" the "trigger criteria" can be set as "The geofence rule is "true" if a device location is within any area defined in the fence, otherwise "false"." According to one embodiment, device data is sent to an application only if the geofence rule is evaluated to true. The data is decorated with the "area id" that triggered the fence. For Geofence "event type" "outside" the "trigger criteria" can be set as "The geofence rule is "true" if a device location is outside all area defined in the fence, otherwise "false"." Thus, according to one embodiment, device data is sent to the application only if the geofence rule is evaluated to true.

FIG. 11 illustrates an example of user defined location attributes according to an embodiment of the present invention. According to such an embodiment, user defined location attributes includes normalizing the data model definition using the "metadata" field. For example, for "normalized property", the description can be "LOC_LAT", "LOC_LON" and/or "LOC_ALT". "LOC_LAT" indicates that this data model parameter designates latitude. Default is "latitude". "LOC_LON" indicates that this data model parameter designates longitude. Default is "longitude" and "LOC_ALT" indicates that this data model parameter designates altitude. Default is "altitude".

For example, according to one embodiment,

```
{
  "id" : "myDeviceDataModel_1 ",
  "scIDataSchema" : {
    "id" : "mySchema_1 ",
    "encoding" : "JSON",
    "parameters" : [ {
      "name" : "deviceLatitude",
      "type" : "STRING",
      "isIndexed" : false,
      "metainfo" : {
        "uom" : "degree",
        "normalizedProperty" : "LOC_LAT"
      }
```

-continued

```
    }, {
      "name" : "deviceLongitude",
      "type" : "STRING",
      "isIndexed" : false,
      "metainfo" : {
        "uom" : "degree",
        "normalizedProperty" : "LOC_LON"
      }
    }, {
      "name" : "deviceAltitude",
      "type" : "STRING",
      "isIndexed" : false,
      "metainfo" : {
        "uom" : "degree",
        "normalizedProperty" : "LOC_ALT"
      }
    }]
  }
}
```

Figure 12:
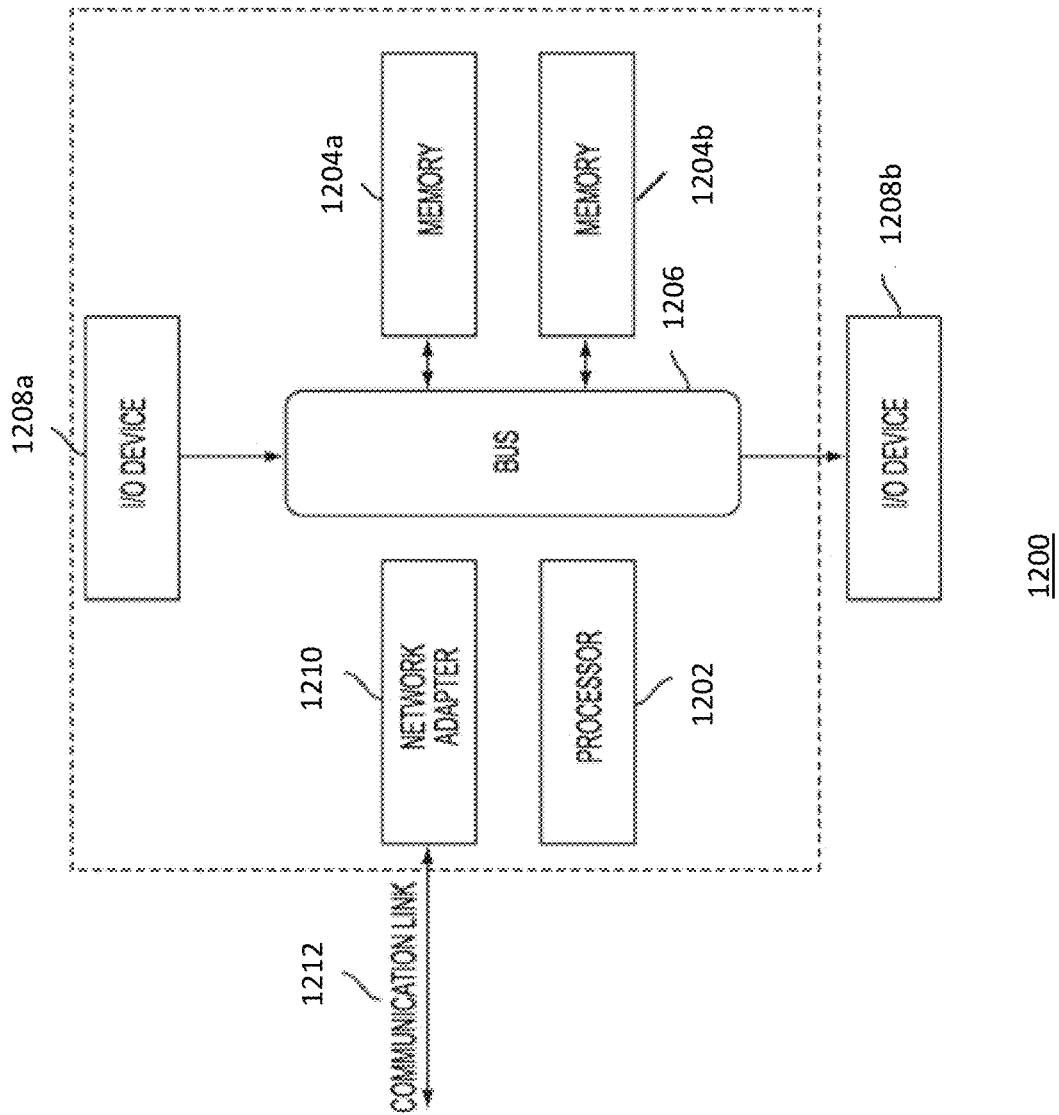
FIG. 12 illustrates a data processing system 1200 suitable for storing the computer program product and/or executing program code relating to the choices of the users in accordance with an embodiment of the present invention.

FIG. 12 illustrates a data processing system 1200, including an M2M device, suitable for storing the computer program product and/or executing program code in accordance with an embodiment of the present invention. The data processing system 1200 includes a processor 1202 coupled to memory elements 1204a-b through a system bus 1206. In other embodiments, the data processing system 1200 may include more than one processor and each processor may be coupled directly or indirectly to one or more memory elements through a system bus.

Memory elements 1204a-b can include local memory employed during actual execution of the program code, bulk storage, and cache memories that provide temporary storage of at least some program code in order to reduce the number of times the code must be retrieved from bulk storage during execution. As shown, input/output or I/O devices 1208a-b (including, but not limited to, keyboards, displays, pointing devices, etc.) are coupled to the data processing system 1200. I/O devices 1208a-b may be coupled to the data processing system 1200 directly or indirectly through intervening I/O controllers (not shown).

In FIG. 12, a network adapter 1210 is coupled to the data processing system 1202 to enable data processing system 1202 to become coupled to other data processing systems or remote printers or storage devices through communication link 1212. Communication link 1212 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application or similar while the primary software and data are stored on servers or locations apart from the devices.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for monitoring activity of one or more Machine to Machine (M2M) devices relative to a geofence via remote computer or server with monitoring application, the computer-implemented method comprising:

enabling a user to define location attributes by providing interactive user interface;
configuring the geofence by using the user defined location attributes;
receiving device activity information from the one or more M2M devices, wherein device activity information from the one or more M2M devices further comprises one or more of: location of the device relative to the geofence, time of arrival of the device at a particular location, time of departure of the device from a particular location, speed of the device at a particular location, speed of the device at a particular time, or a combination thereof;
evaluating the device activity information based on predetermined geofence parameters relative to the geofence; and
issuing an alert if at least one of the one or more M2M devices is performing outside the predetermined geofence parameters.

2. The computer-implemented method of claim 1, wherein enabling a user to define location attributes further comprises allowing a user to define boundaries of the geofence by selecting a shape from a plurality of shapes to enable drawing mode and using a drawing tool in combination with commercially available mapping products to draw the geofence using the selected shape by clicking and dragging a mouse on a map.

3. The computer-implemented method of claim 1, wherein the user defined location attributes further comprise one or more of: a latitude, longitude, altitude, or a combination thereof.

4. The computer-implemented method of claim 1, wherein evaluating the device activity relative to the geofence based on predetermined geofence parameters comprises comparing values provided by the user for one or more parameters to values received as the device activity information for that parameter.

5. The computer-implemented method of claim 1, wherein evaluating the device activity relative to the geofence based on predetermined geofence parameters comprises evaluating device activity information relative to location information for the one or more M2M devices.

6. The computer-implemented method of claim 5, wherein the location information for the one or more M2M devices is extracted from the device activity information using the user defined location attributes.

7. The computer-implemented method of claim 1, wherein the one or more M2M devices comprise a device including a processor, a memory, a communications adapter in communication with a network and a sensor.

8. The computer-implemented method of claim 1, wherein the geofence comprises a user defined geographic area.

9. A system for monitoring activity of one or more Machine to Machine (M2M) devices relative to a geofence via remote computer or server with monitoring application, the system comprising an enablement platform for building web sites and web applications using data storage and management capabilities of hosted web services, wherein the web application created by using the enablement platform:
enables a user to define location attributes by providing interactive user interface;
configures the geofence by using the user defined location attributes;
receives predetermined parameters for the configured geofence;
tracks one or more M2M devices and their activity relative to the geofence;
evaluates device activity relative to the geofence based on predetermined geofence parameters, wherein device activity information from the one or more M2M devices further comprises one or more of: location of the device relative to the geofence, time of arrival of the device at a particular location, time of departure of the device from a particular location, speed of the device at a particular location, speed of the device at a particular time, or a combination thereof; and
issues an alert if at least one of the one or more M2M devices is performing outside the predetermined geofence parameters.

10. The system of claim 9, wherein enabling a user to define location attributes further comprises allowing a user to define boundaries of the geofence by selecting a shape from a plurality of shapes to enable drawing mode and using a drawing tool in combination with commercially available mapping products to draw the geofence using the selected shape by clicking and dragging a mouse on a map.

11. The system of claim 9, wherein the user defined location attributes further comprise one or more of: a latitude, longitude, altitude, or a combination thereof.

12. The system of claim 9, wherein evaluating the device activity relative to the geofence based on the predetermined geofence parameters comprises comparing values provided by the user for one or more parameters to the values received as the device activity information for that parameter.

13. The system of claim 9, wherein evaluating the device activity relative to the geofence based on the predetermined geofence parameters comprises evaluating device activity information relative to location information for the one or more M2M devices.

14. The system of claim 13, wherein the location information for the one or more M2M devices is extracted from the device activity information using the user defined location attributes.

15. The system of claim 9, wherein the one or more M2M devices comprise a device including a processor, a memory, a communications adapter in communication with a network and a sensor.

16. The system of claim 9, wherein the geofence comprises a user defined geographic area.

17. A computer program product embodied on a non-transitory computer readable medium, comprising computer code which when executed by a computer causes the computer to perform a method for monitoring activity of one or more Machine to Machine (M2M) devices relative to a geofence via remote computer or server with monitoring application, comprising:
enabling a user to define location attributes by providing interactive user interface;
configuring the geofence by using user defined location attributes;
receiving device activity information from the one or more M2M devices, wherein the device activity information from the one or more M2M devices further comprises one or more of: location of the device relative to the geofence, time of arrival of the device at a particular location, time of departure of the device from a particular location, speed of the device at a particular location, speed of the device at a particular time, or a combination thereof;
evaluating the device activity information based on predetermined geofence parameters relative to the geofence; and issuing an alert if at least one of the one or more M2M devices is performing outside the predetermined geofence parameters.

18. The computer program product of claim 17, wherein enabling a user to define location attributes further comprises allowing a user to define boundaries of the geofence by selecting a shape from a plurality of shapes to enable drawing mode and using a drawing tool in combination with commercially available mapping products to draw the geofence using the selected shape by clicking and dragging a mouse on a map.

19. The computer program product of claim 17, wherein the user defined location attributes further comprise one or more of: a latitude, longitude, altitude, or a combination thereof.

20. The computer program product of claim 17, wherein evaluating the device activity relative to the geofence based on predetermined geofence parameters comprises comparing values provided by the user for one or more parameters to the values received as the device activity information for that parameter.

21. The computer program product of claim 17, wherein evaluating device activity relative to the geofence based on the predetermined geofence parameters comprises evaluating the device activity information relative to location information for the one or more M2M devices.

22. The computer program product of claim 21, wherein the location information for the one or more M2M devices is extracted from the device activity information using the user defined location attributes.

23. The computer program product of claim 17, wherein the one or more M2M devices comprise a device including a processor, a memory, a communications adapter in communication with a network and a sensor.

24. The computer program product of claim 17, wherein the geofence comprises a user defined geographic area.

\* \* \* \* \*